(12) United States Patent
Nishimura et al.

(10) Patent No.: US 9,166,233 B2
(45) Date of Patent: Oct. 20, 2015

(54) FUEL CELL SYSTEM AND OPERATING METHOD THEREOF

(75) Inventors: Hidetaka Nishimura, Yokosuka (JP); Keigo Ikezoe, Ayase (JP); Masashi Sato, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 147 days.

(21) Appl. No.: 13/821,170

(22) PCT Filed: Sep. 1, 2011

(86) PCT No.: PCT/JP2011/069912
§ 371 (c)(1),
(2), (4) Date: Mar. 6, 2013

(87) PCT Pub. No.: WO2012/033003
PCT Pub. Date: Mar. 15, 2012

(65) Prior Publication Data
US 2013/0164649 A1 Jun. 27, 2013

(30) Foreign Application Priority Data
Sep. 9, 2010 (JP) .................... 2010-202267

(51) Int. Cl.
*H01M 2/00* (2006.01)
*H01M 8/04* (2006.01)
*H01M 8/24* (2006.01)

(52) U.S. Cl.
CPC ...... *H01M 8/04089* (2013.01); *H01M 8/04462* (2013.01); *H01M 8/04753* (2013.01); *H01M 8/04231* (2013.01); *H01M 8/242* (2013.01); *Y02E 60/50* (2013.01)

(58) Field of Classification Search
CPC .............. H01M 8/04089; H01M 8/04231
USPC .............. 429/444, 446, 432, 442, 456
See application file for complete search history.

(56) References Cited

U.S. PATENT DOCUMENTS

| 2005/0112431 A1* | 5/2005 | Hamada et al. ............ 429/26 |
| 2008/0118793 A1* | 5/2008 | Chapman et al. ........... 429/13 |

FOREIGN PATENT DOCUMENTS

| JP | 2008-097966 A | 4/2008 |
| JP | 2008-176975 A | 7/2008 |
| JP | 2010-123501 A | 6/2010 |

OTHER PUBLICATIONS

Canadian Office Action, Application No. 2,810,657, Feb. 25, 2014, 2 pages.

*Primary Examiner* — Cynthia H Kelly
*Assistant Examiner* — Monique Wills
(74) *Attorney, Agent, or Firm* — Foley & Lardner LLP

(57) ABSTRACT

An anode gas non-recirculation type fuel cell system includes a fuel cell, a buffer tank for purging impurity gas included in anode off-gas from the fuel cell stack, an impurity gas concentration detector for detecting impurity gas concentration in the buffer tank, and an anode gas supply unit for supplying anode gas to the fuel cell stack. When pressure-supplying impurity gas in the fuel cell stack to the buffer tank while pulsating a supply pressure by the anode gas supply unit, an activation control is executed by changing, by the anode gas supply unit, at least one of a pulsative pressure and a pulsative cycle of anode gas supply according to impurity gas concentration in the buffer tank. According to the system, it is possible to get adequate hydrogen gas concentration in a fuel cell stack and to remove impurity at its activation.

10 Claims, 10 Drawing Sheets

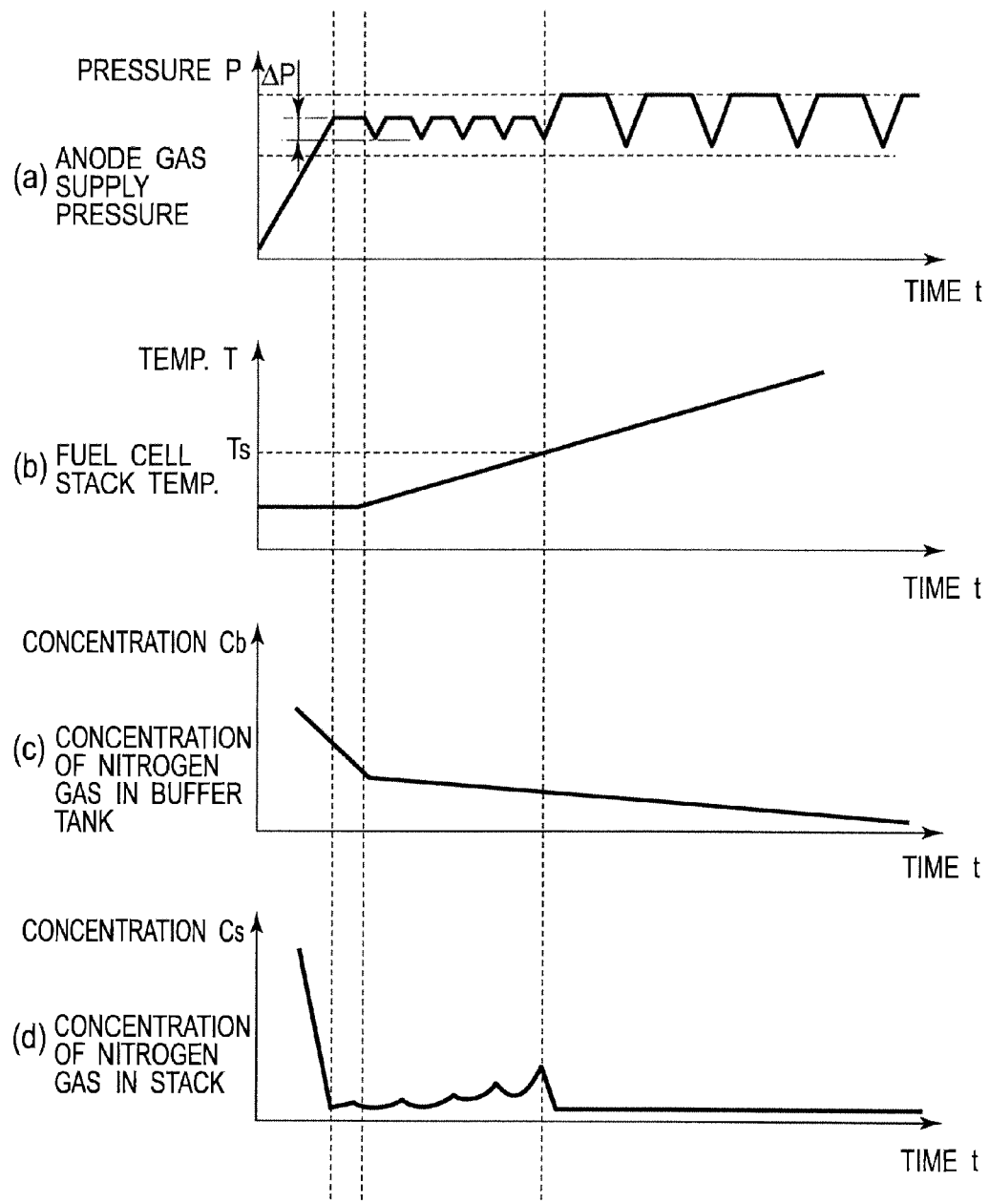

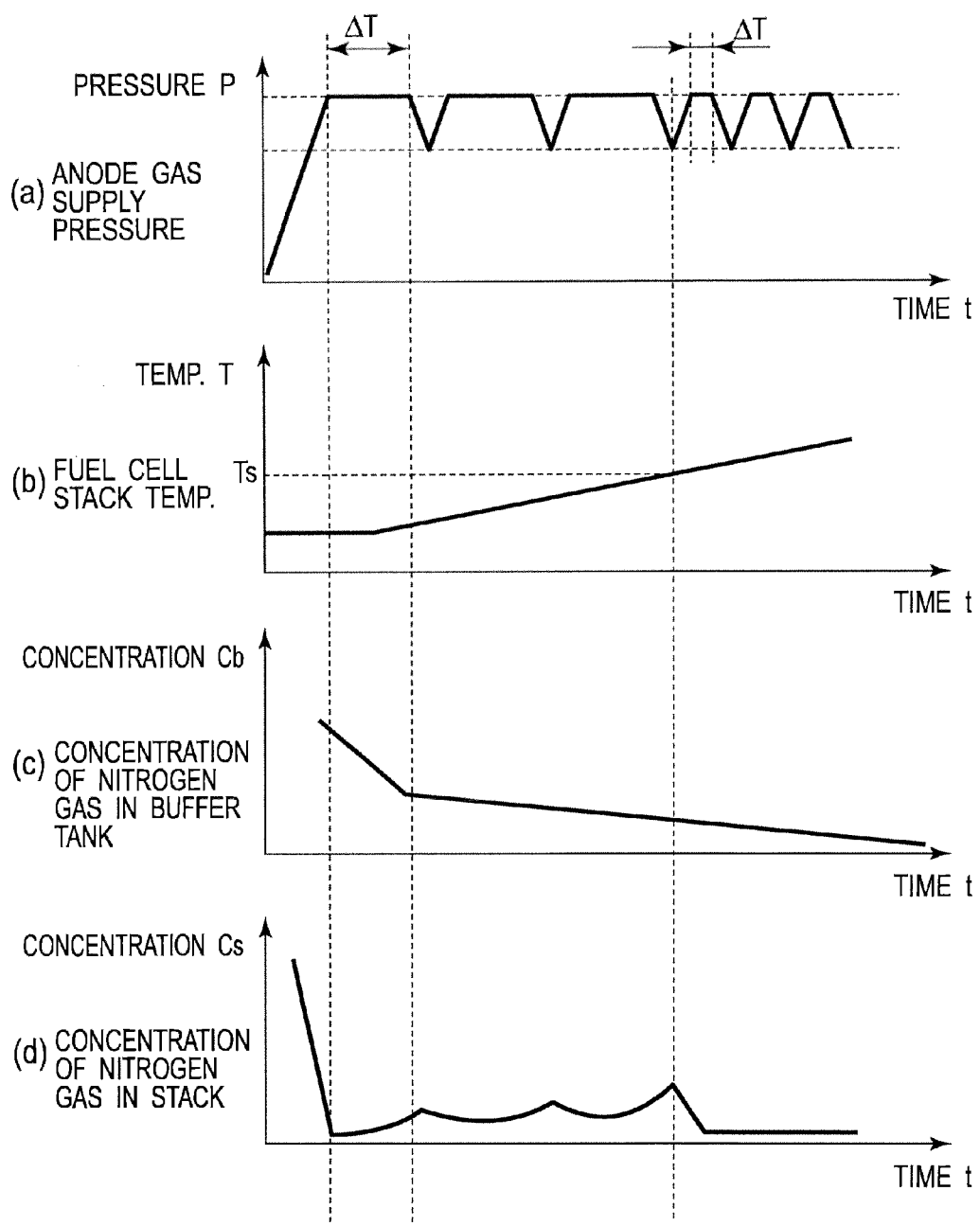

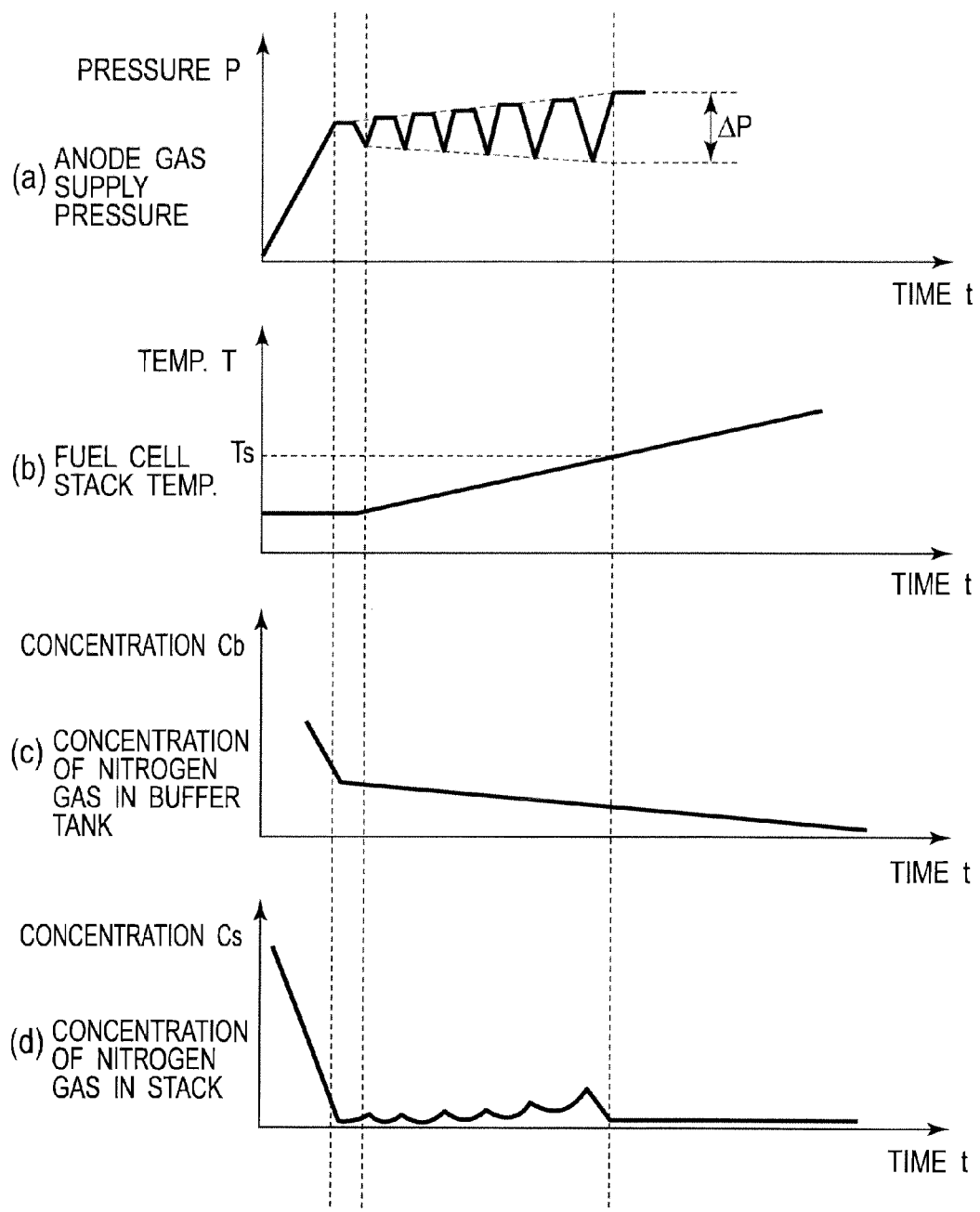

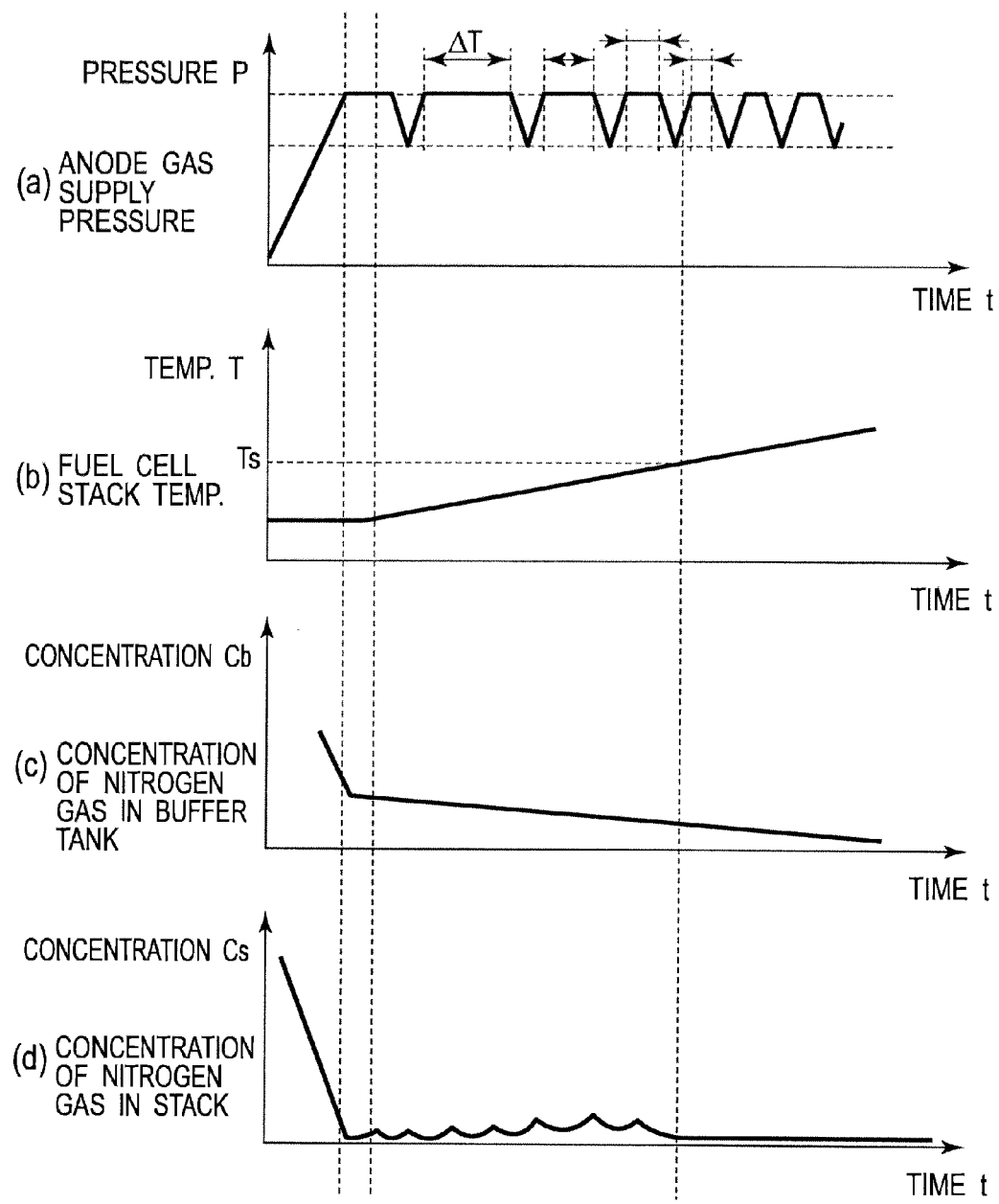

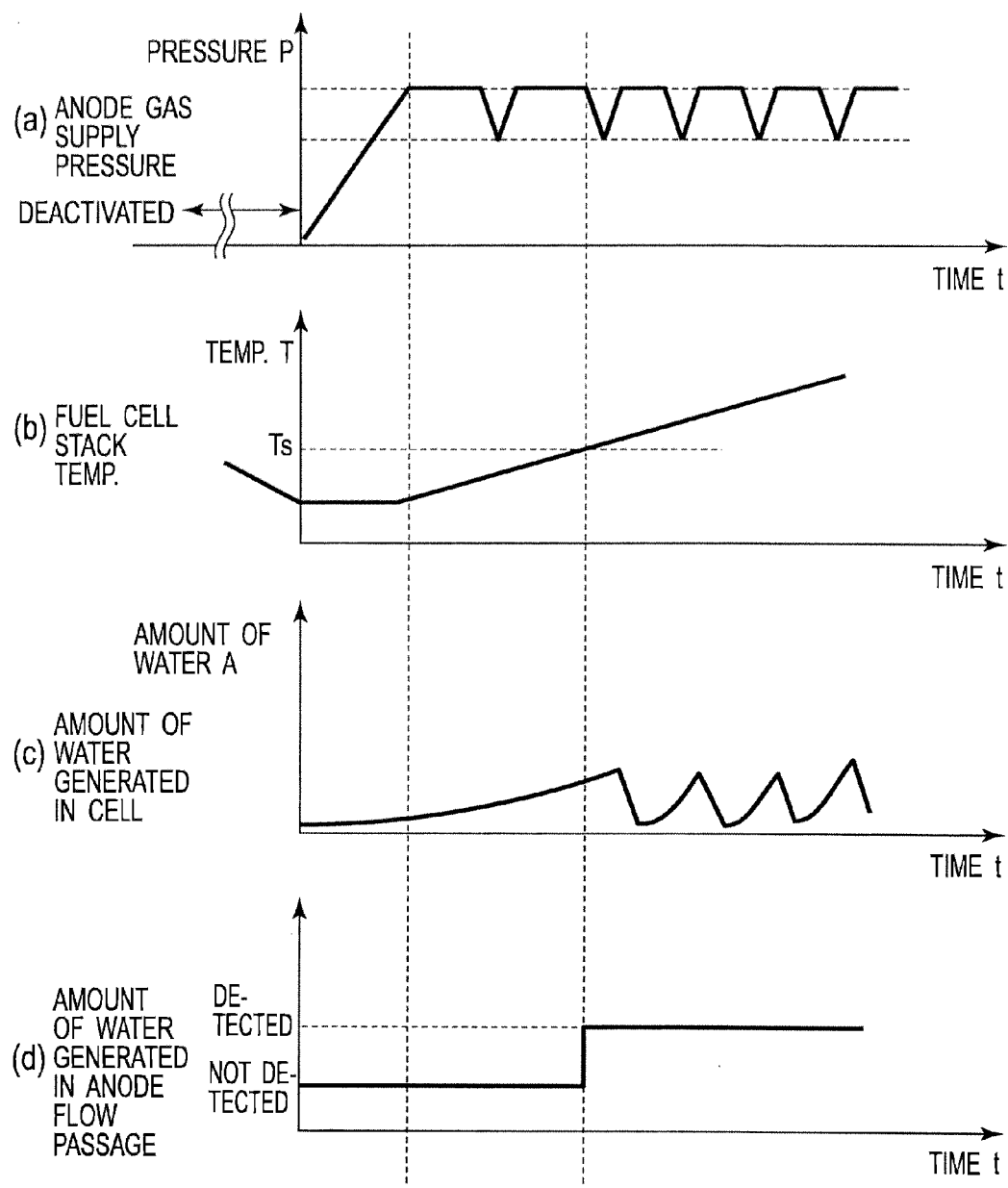

FUEL CELL SYSTEM AND OPERATING METHOD THEREOF

TECHNICAL FIELD

The present invention relates to an anode gas non-recirculation type fuel cell system, and to an operating method thereof.

BACKGROUND ART

A prior art anode gas non-recirculation type fuel cell system disclosed in a Patent Literature 1 listed below includes a fuel cell stack configured by stacking plural fuel cells, and includes a hydrogen tank, a supply cutoff valve and a regulation valve as an anode gas supply system to the fuel cell stack. In addition, it also includes a reservoir tank (buffer tank) and a discharge cutoff valve (purge valve) as an anode gas exhaust system.

In the above fuel cell system, set are a first control condition in which an amount of anode gas supplied to the fuel cell stack is small and a second control condition in which an amount of anode gas supplied to the fuel cell stack is large, and a supply pressure of anode gas is pulsated by repeating the first and second control conditions. As a result, accumulation of impurities in some of the fuel cells is prevented, and anode exhaust gas is exhausted to the reservoir tank.

CITATION LIST

Patent Literature

Patent Literature 1: Japanese Patent Application Laid-Open No. 2008-97966

SUMMARY OF INVENTION

Generally, in an anode gas non-recirculation type fuel cell system, a large amount of impurity gas (mostly, nitrogen gas) tends to stay in a fuel cell stack when the system is deactivated for a long time. When the fuel cell system is activated in a state where a large amount of impurity gas (mostly, nitrogen gas) stays in a fuel cell stack, this residual impurity gas in the fuel cell stack is replaced with hydrogen gas and then exhausted to a buffer tank, and thereby concentration of the residual impurity gas (nitrogen gas) in the buffer tank increases.

Therefore, if a supply pressure of anode gas is pulsated when activating the system, the high-concentration residual impurity gas (nitrogen gas) may flow reversely from the buffer tank to the fuel cell stack. As a result, hydrogen partial pressure may become insufficient on an anode-gas exhaust-side of an active area (power generation area) of the fuel cell stack, and thereby electrical voltage of the fuel cell may reduce or, in the worst case, the fuel cell may become degraded.

An object of the present invention provides an operating method of a fuel cell system that can get adequate concentration of hydrogen gas in a fuel cell stack and remove impurity gas when activating an anode gas non-recirculation type fuel cell system.

A first aspect of the present invention provides an anode gas non-recirculation type fuel cell system, comprising: a fuel cell stack constituted by stacking a plurality of fuel cells; a buffer tank for discharging, to an outside, impurity gas included in anode off-gas exhausted from the fuel cell stack; an impurity gas concentration detector for detecting concentration of impurity gas in the buffer tank; and an anode gas supply unit for supplying anode gas to the fuel cell stack, wherein, when pressure-supplying impurity gas in the fuel cell stack to the buffer tank while pulsating a supply pressure by the anode gas supply unit, an activation control is executed by changing, by the anode gas supply unit, at least one of a pulsative pressure and a pulsative cycle of anode gas supply according to concentration of impurity gas in the buffer tank detected by the impurity gas concentration detector.

A second aspect of the present invention provides an operating method of an anode gas non-recirculation type fuel cell system that includes a fuel cell stack constituted by stacking a plurality of fuel cells and a buffer tank for discharging, to an outside, impurity gas included in anode off-gas exhausted from the fuel cell stack, and has a configuration for pressure-supplying impurity gas in the fuel cell stack to the buffer tank by pulsating a supply pressure of anode gas to the fuel cell stack, the fuel cell system further including an impurity gas concentration detector for detecting concentration of impurity gas in the buffer tank, the method comprising: executing an activation control for changing at least one of a pulsative pressure and a pulsative cycle of anode gas being supplied to the fuel cell stack according to concentration of impurity gas in the buffer tank detected by the impurity gas concentration detector.

BRIEF DESCRIPTION OF DRAWINGS

FIG. 9 ($a$) is a graph showing relation between time and anode gas supply pressure, (h) is a graph showing relation between time and stack temperature, (c) is a graph showing relation between time and concentration of nitrogen gas in a buffer tank, and (d) is a graph showing relation between time and concentration of nitrogen gas in a fuel cell stack, in a pulsative pressure control.

FIG. 10 ($a$) is a graph showing relation between time and anode gas supply pressure, (b) is a graph showing relation between time and stack temperature, (c) is a graph showing relation between time and concentration of nitrogen gas in a buffer tank, and (d) is a graph showing relation between time and concentration of nitrogen gas in a fuel cell stack, in a pulsative cycle control.

FIG. 11 ($a$) is a graph showing relation between time and anode gas supply pressure, (b) is a graph showing relation between time and stack temperature, (c) is a graph showing relation between time and concentration of nitrogen gas in a buffer tank, and (d) is a graph showing relation between time and concentration of nitrogen gas in a fuel cell stack, in another pulsative pressure control.

FIG. 12 ($a$) is a graph showing relation between time and anode gas supply pressure, (b) is a graph showing relation between time and stack temperature, (c) is a graph showing relation between time and concentration of nitrogen gas in a buffer tank, and (d) is a graph showing relation between time and concentration of nitrogen gas in a fuel cell stack, in another pulsative cycle control.

FIG. 13 (a) is a graph showing relation between time and anode gas supply pressure, (b) is a graph showing relation between time and stack temperature, (c) is a graph showing relation between time and amount of water generated in a fuel cell, and (d) is a graph showing relation between time and amount of water generated in an anode flow passage, in a normal pulsation control according to generated water.

DESCRIPTION OF EMBODIMENTS

Figure 1:
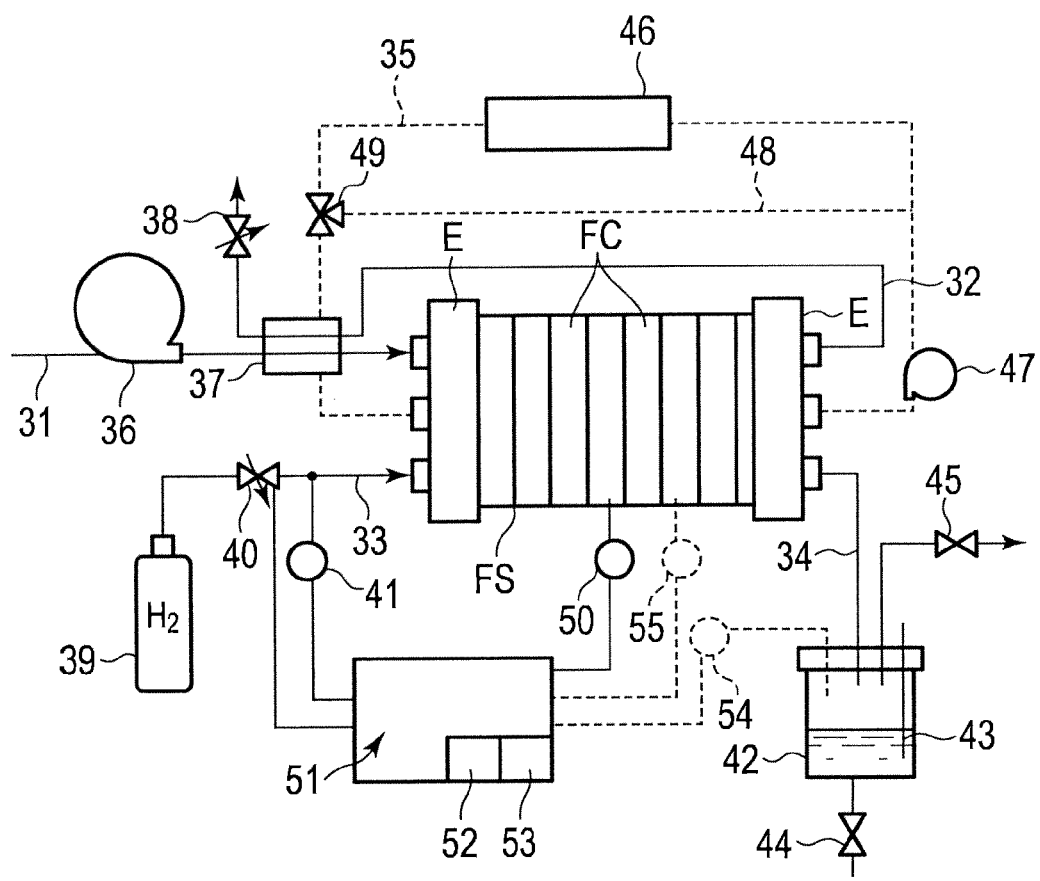
FIG. 1 It is a configuration diagram of an anode gas non-recirculation type fuel cell system according to an embodiment.

FIG. 1 shows a fuel cell system to which an operating method of a fuel cell system according to an embodiment can be applied. This fuel cell system is an anode gas non-recirculation type in which anode gas flows on a one-way path from a supply side to an exhaust side.

The fuel cell includes a fuel cell stack FS constituted by stacking plural fuel cells (units) FC. In addition, cathode gas (oxidant gas: air) supply passage 31 and exhaust passage 32, anode gas (fuel gas: hydrogen gas) supply passage 33 and exhaust passage 34, and a coolant recirculation passage 35 are connected to the fuel cell stack FS.

Figure 2:
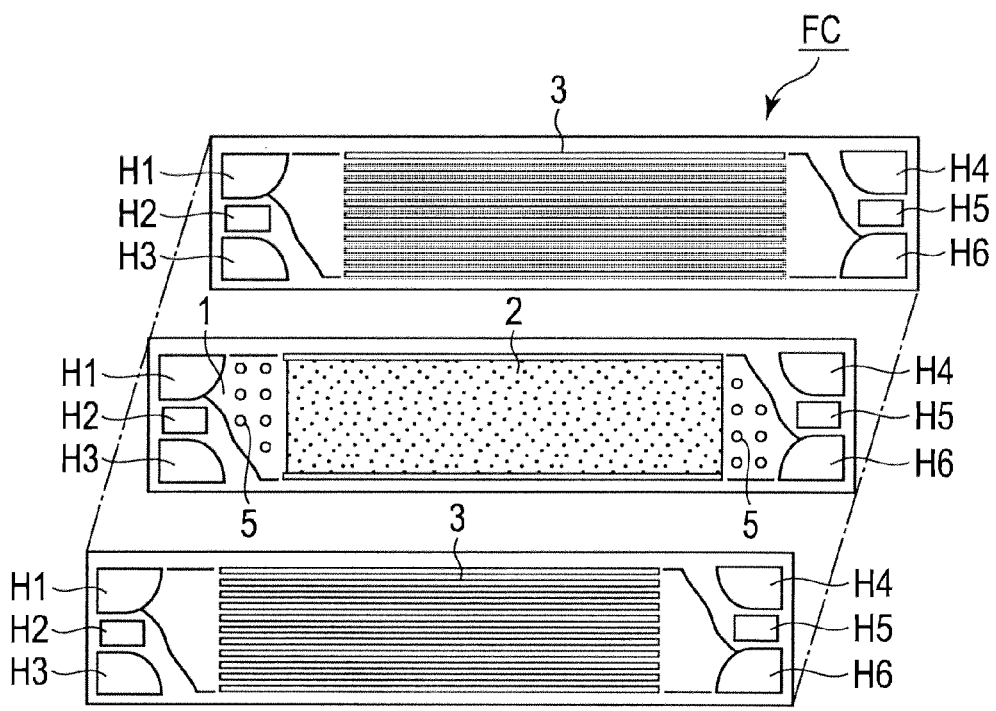
FIG. 2 It is an exploded plan view of a fuel cell.
Figure 3:
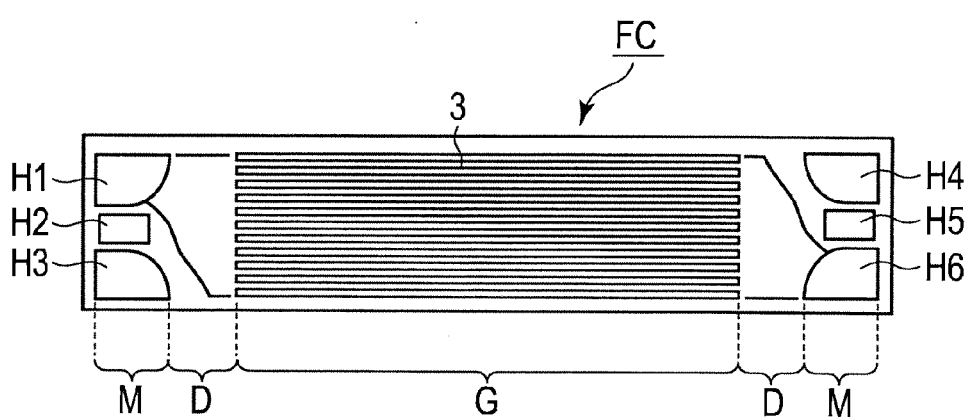
FIG. 3 It is a plan view of the fuel cell.

As shown in FIGS. 2 and 3, the fuel cell stack FS includes a membrane electrode structure 2 provided with a frame 1 around itself, and two separators 3 that sandwiches the frame 1 and the membrane electrode structure 2.

The frame 1 is integrated with the membrane electrode structure 2 by resin molding (e.g. injection molding), and has a rectangular shape at whose center the membrane electrode structure 2 is disposed in the present embodiment. In addition, three manifold holes H1 to H6 are formed on each of both sides of the frame 1. Areas between the manifold holes the membrane electrode structure 2 are diffuser sections D explained later.

The membrane electrode structure 2 is generally called as an MEA (Membrane Electrode Assembly), and has a structure in which an electrolyte layer made of solid polymer is sandwiched by a fuel electrode layer (anode) and an oxidant electrode layer (cathode) for example.

Each of the separators 3 has a rectangular shape with longitudinal and vertical dimensions almost identical to those of the frame 1, and forms cathode gas flow passages and anode gas flow passages at an area intermediately formed with the frame 1 and the membrane electrode structure 2. The separator 3 is formed by press-forming a sheet metal such as a stainless sheet, and its center portion corresponding to the membrane electrode structure 2 is formed so as to have a waved shape in a cross-sectional plane along its short side. This waved shape is formed continuously along its long side, and its internally convex portions are contacted with the membrane electrode structure 2 and its concave portions form the gas flow passages.

In addition, manifold holes H1 to H6 similar to the manifold holes H1 to H6 of the frame 1 are formed on both sides of the separator 3. Areas between the manifold holes and the cross-sectional wave-shaped portion are diffuser sections explained later.

The fuel cell FC is made by laminating the frame 1 and the membrane electrode structure 2, and a pair of the separators 3. As shown in FIG. 3, the fuel cell FC has, at its center, a power section G corresponding to an area of the membrane electrode structure 2. On each of both sides of the power section G, a manifold section M for supplying or exhausting of reactant gas and the diffuser section D between the manifold section M and the power section G are provided.

When the plural fuel cells FC are stacked, the manifold holes H1 to H6 form flow passages along a stacking direction. In one of the manifold sections M on the left side in FIG. 3, the manifold holes H1 form a cathode gas supply flow passage, the manifold holes H2 form a coolant supply passage, and the manifold holes H3 form an anode gas supply passage. And in another of the manifold sections M on the right side in FIG. 3, the manifold holes H4 form an anode gas exhaust flow passage, the manifold holes H5 form a coolant discharge passage, and the manifold holes H6 form a cathode gas exhaust passage. Note that all or some of the supply passages and the exhaust/discharge passages may be arranged reversely.

The above-explained plural fuel cells FC are stacked as shown in FIG. 1 and end plates E are attached both ends thereof to constitute the fuel cell stack FS. Here, in the fuel cell stack FS, the stacked fuel cells FC are pressed by an elastic member attached to one of the end plates E toward another of the end plates E along the stacking direction, and thereby a contact surface pressure is applied to the fuel cells FC to keep gas sealing characteristics and thermal conduction characteristics well.

In the fuel cell system including the above-explained fuel cell stack FS, an air supply unit 36 such as a compressor and a humidifier 37 for humidifying supplied air from the air supply unit 36 are provided on the cathode gas supply passage 31. In addition, the cathode gas exhaust passage 32 supplies, to the humidifier 37, water vapor included in cathode gas exhausted from the fuel cell stack FS (cathode off-gas), and releases the cathode off-gas to the atmosphere via the back pressure regulation valve 38 at a downstream of the humidifier 37.

The anode gas supply passage 33 is extended from a hydrogen tank 39 to the fuel cell stack FS, and a hydrogen regulation valve 40 and a hydrogen pressure sensor 41 are provided on its route. Here, the hydrogen tank 39, the anode gas supply passage 33, the hydrogen regulation valve 40 and the hydrogen pressure sensor 41 function as an anode gas supply unit for supplying anode gas (hydrogen gas) to the fuel cell stack FS. In addition, the anode gas exhaust passage 34 is extended from the fuel cell stack FS to a buffer tank 42. Since anode gas exhausted from the fuel cell stack FS (anode off-gas) includes impurity gas such as nitrogen gas and water vapor, the anode off-gas is exhausted to the buffer tank 42 through the anode gas exhaust passage 34.

The buffer tank 42 includes a level sensor 43 for detecting an amount of water accumulated in its inside, a drain valve 44 for draining the water to its outside, and a nitrogen purge valve 45 for releasing nitrogen gas to the atmosphere.

The coolant recirculation passage 35 recirculates coolant that is cooled at a radiator 46. A recirculation pump 47 and a three-way valve 49 are provided on the coolant recirculation passage 35. A bypass passage 48 bypassing the radiator 46 is connected to the coolant recirculation passage 35, the three-way valve 49 is located on a connecting point of an upstream end of the bypass passage 48 and the recirculation passage 35. In addition, the fuel cell stack FS is provided with a stack temperature detector (temperature sensor) 50 for detecting its internal temperature (stack temperature).

Further, the fuel cell system includes a controller 51 for controlling the air supply unit 36, the hydrogen regulation valve 40, the drain valve 44, the nitrogen purge valve 45, the recirculation pump 47, the three-way valve 49 and so on.

Control programs for various devices are stored in the controller 51, and the controller 51 includes an activation control unit 52 for executing the operating method according to the present embodiment, and a timer 53 for measuring deactivation time of the system. In addition, detection signals from the hydrogen pressure sensor 41, the level sensor 43 and the stack temperature detector 50, current value of the fuel cell stack FS, current value of each of the fuel cells FC and so on are input to the controller 51.

The activation control unit 52 stores data indicating relation between stack temperature and a impurity gas yield, supply pressure map for anode gas and so on. The supply pressure map is a reference map for setting anode gas supply pressure adequately according to temperature and load of the fuel cell stack FS.

Here, an operational temperature range of the fuel cell stack FS is envisioned as −20 to 80° C. in view of operational temperature (about 80° C.) of the fuel cell stack FS and a long-time deactivation state below 0° C. Concentration of nitrogen gas can be detected by extrapolation based on the stack temperature.

The activation control unit 52 of the controller 51 has a function for detecting concentration of nitrogen gas in the buffer tank 42 or in the fuel cell stack FS by extrapolation, and thereby functions as an impurity gas concentration detector. Namely, the activation control unit 52 detects concentration of nitrogen gas by extrapolation by utilizing various data preliminarily stored.

In the operating method of the fuel cell system according to the present embodiment, an activation control is executed by using the function of the activation control unit 52 for detecting concentration of nitrogen gas. In the activation control, at least one of a pulsative pressure $\Delta P$ or pulsative cycle $\Delta T$ of anode gas is varied based on the stack temperature.

Here, the pulsative pressure $\Delta P$ is a difference between an upper limit pressure and a lower limit pressure of pulsation (see FIG. 9(a)). Therefore, setting of the pulsative pressure $\Delta P$ is identical to setting of the upper limit pressure and the lower limit pressure. And, the pulsative cycle $\Delta T$ may be time for keeping the upper limit pressure (see FIG. 10(a)), or time of one pitch composed of the upper limit pressure and the lower limit pressure.

Specifically, when the stack temperature detected by the stack temperature detector 50 is lower than preset temperature Ts, an activation control for making the pulsative pressure $\Delta P$ smaller than that in a normal pulsation control and/or an activation control for making the pulsative cycle $\Delta T$ longer than that in a normal pulsation control are/is executed.

Further, when deactivation time measured by the timer 53 is equal-to or longer-than preset time ts, an activation control for making the pulsative pressure $\Delta P$ smaller than that in a normal pulsation control and/or an activation control for making the pulsative cycle $\Delta T$ longer than that in a normal pulsation control are/is executed in addition to the above control. Note that, as a matter of course, it is possible to control both of the pulsative pressure $\Delta P$ and the pulsative cycle $\Delta T$.

Figure 4:
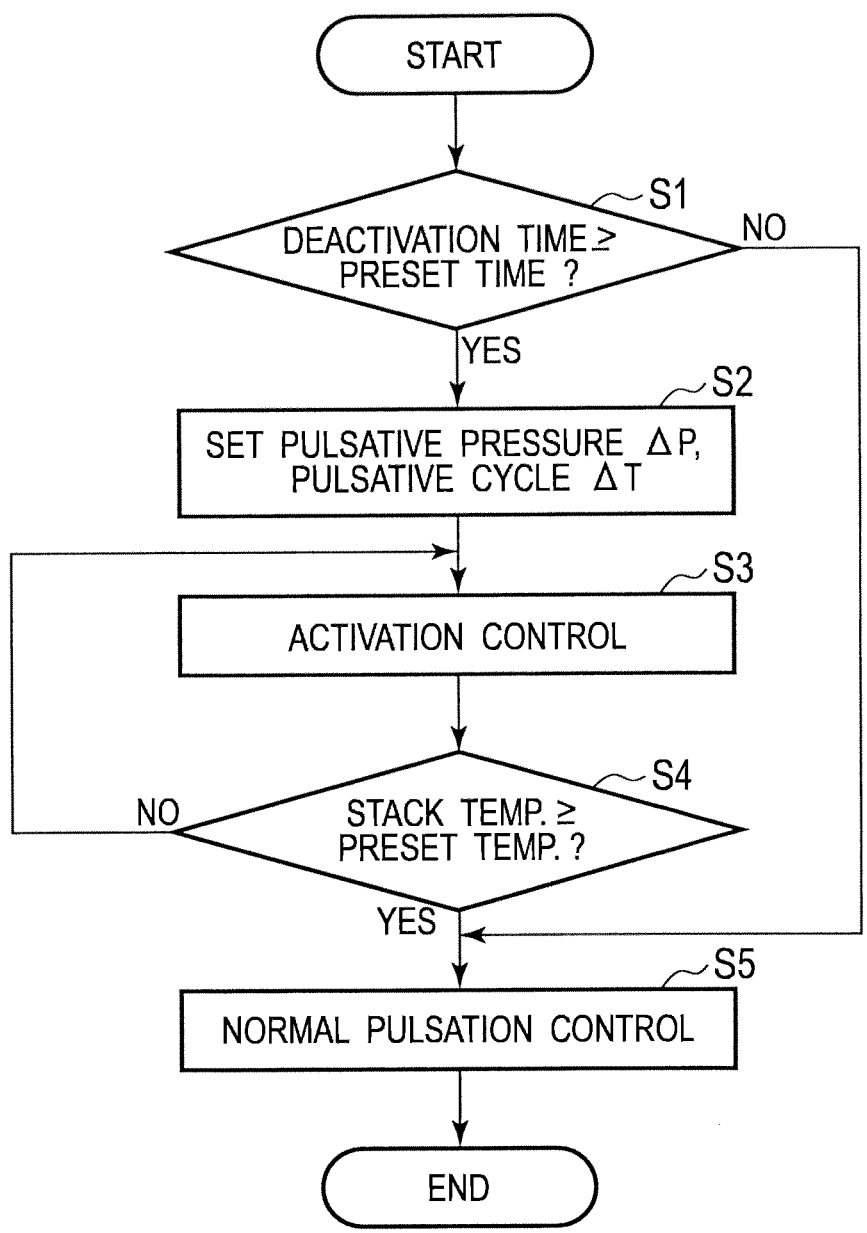
FIG. 4 It is a flowchart showing an operating method of a fuel cell system according to an embodiment.

The operating method of the fuel cell system according to the present embodiment will be explained with reference to a flowchart shown in FIG. 4. The present embodiment can adequately address inconvenience at activation under a condition where a residual amount of impurity gas in the fuel cell stack FS is large. Namely, the present embodiment can adequately address a reverse flow of impurity gas caused by supply pressure pulsation of anode gas at activation after long-time deactivation in a low-temperature environment. Therefore, judgment of deactivation time is firstly made.

When the system is activated, it is judged whether or not deactivation time measured by the timer 53 is equal-to or longer-than preset time (step S1). Here, the preset time is set based on the above-explained data stored in the activation control unit 52.

When the deactivation time is shorter than the preset time (No in step S1), a residual amount of impurity gas in the fuel cell stack FS is assumed to be small and thereby a normal pulsation control for pulsating an anode gas supply pressure is executed (step S5). Anode gas is supplied to the fuel cell stack FS, and impurity gas (nitrogen gas) in the fuel cell stack FS is exhausted to the buffer tank 42. An amount of nitrogen gas exhausted to the buffer tank 42 is small because of the small residual amount of nitrogen gas in the fuel cell stack FS at the activation, so that a reverse flow from the buffer tank 42 to the fuel cell stack FS doesn't occur when the normal pulsation control is executed.

On the other hand, when the deactivation time is equal-to or longer-than the preset time (Yes in step S1), a residual amount of impurity gas in the fuel cell stack FS is assumed to be large and thereby the above-explained activation control for changing the pulsative pressure $\Delta P$ or the pulsative cycle $\Delta T$ of anode gas is executed.

Figure 5:
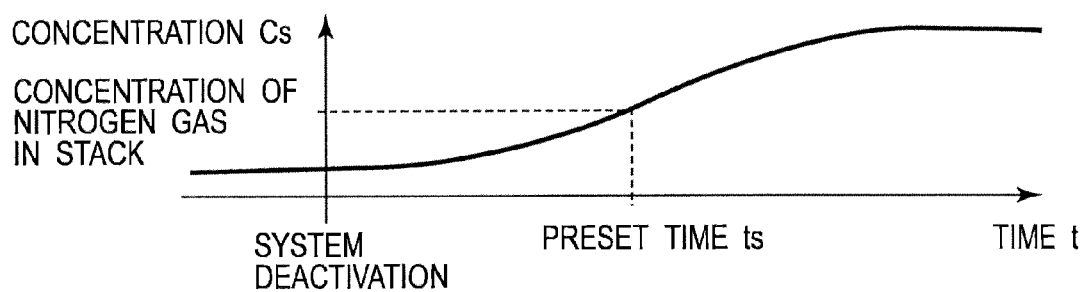
FIG. 5 It is a graph showing variability over time of concentration of nitrogen gas in an anode flow passage.

Note that, as shown in FIG. 5, concentration of nitrogen gas in the fuel cell stack FS (an anode flow passage) gradually increases after the system is deactivated, but the concentration of nitrogen gas is low until the preset time ts after the system is deactivated. As a result, when the system is activated again within the preset time ts, power generation is not affected by the execution of the normal pulsation control because of a small residual amount of nitrogen gas. Therefore, the activation time is judged in step S1 as explained above. Here, the anode flow passage means all anode-side gas-flow areas including the fuel cells FC, the fuel cell stack FS and a piping system.

Figure 6:
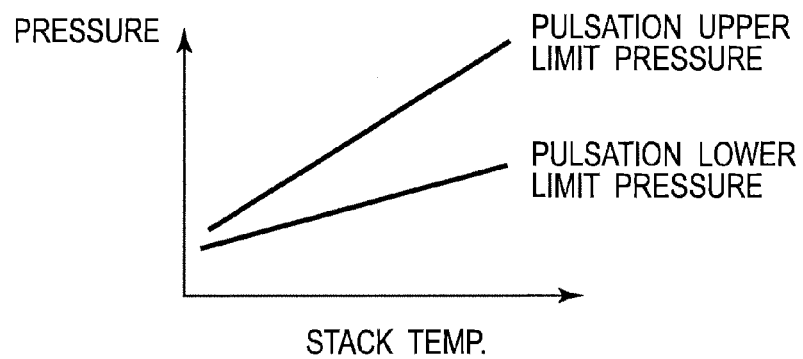
FIG. 6 It is a reference map for retrieving a pulsative pressure.
Figure 7:
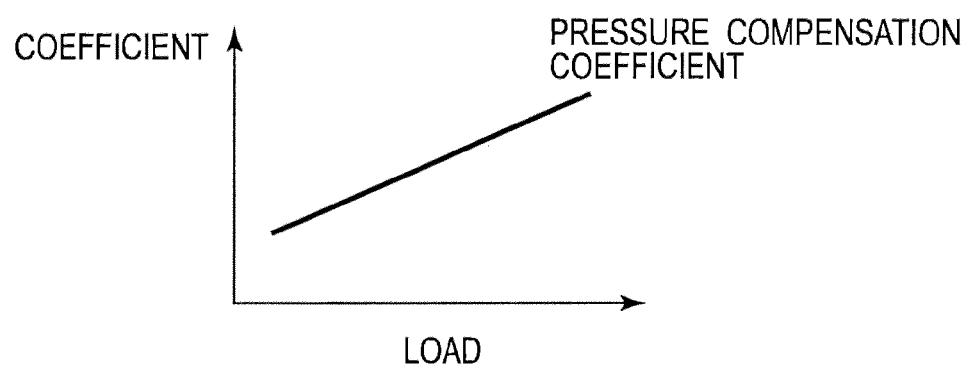
FIG. 7 It is a compensation map for retrieving the pulsative pressure.
Figure 8:
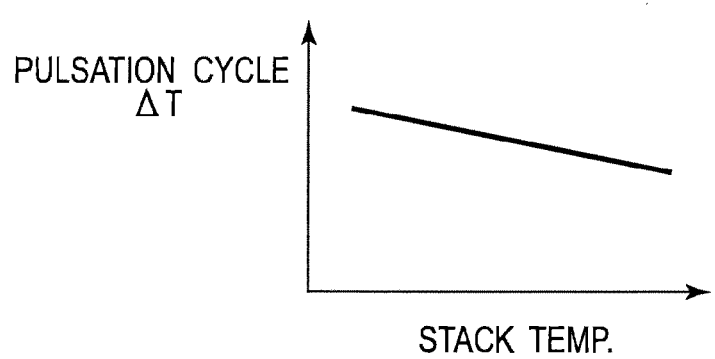
FIG. 8 It is a map for retrieving a pulsative cycle.

When step S1 is affirmed, the pulsative pressure $\Delta P$ and/or the pulsative cycle $\Delta T$ are/is set in order to execute the activation control for preventing a reverse flow of nitrogen gas from the buffer tank 42 (step S2). Specifically, values for the upper limit pressure and the lower limit pressure are retrieved, according to the stack temperature, from a map shown in FIG. 6 which shows relation between the stack temperature and the anode gas supply pressure. Here, it is needed to compensate the retrieved values for the upper limit pressure and the lower limit pressure according to load (current value) of the fuel cell stack FS, so that they are compensated by using a compensation coefficient retrieved from a map shown in FIG. 7. And, the pulsative cycle $\Delta T$ is retrieved from a map shown in FIG. 8. The reason why the pulsative pressure $\Delta P$ and/or the pulsative cycle $\Delta T$ of anode gas are/is set according to the stack temperature in this manner will be explained hereinafter.

In a case of activation under a condition where concentration of nitrogen gas in the buffer tank 42 is high, the concentration of nitrogen gas in the buffer tank 42 reduces and the temperature in the fuel cell stack FS increases due to continuous power generation along with purging and pulsating of anode gas. Therefore, based on the assumption that it is activation, the concentration of nitrogen gas in the buffer tank 42 can be substituted by the temperature in the fuel cell stack FS. The concentration of nitrogen gas in the buffer tank 42 decreases as the temperature in the fuel cell stack FS increases, so that a reverse flow of nitrogen gas becomes hardly occurred and the pulsative pressure $\Delta P$ can be made larger than that at an initial stage of the activation.

In addition, a permeated amount of nitrogen gas from a cathode side increases as the temperature in the fuel cell stack FS increases. Therefore, if the pulsative pressure $\Delta P$ is kept as small as that at the initial stage of the activation, nitrogen gas permeated from a cathode side (cathode off-gas) cannot be exhausted sufficiently to the buffer tank 42. In this case, hydrogen partial pressure in the power generation area may become insufficient. For this reason, the concentration (permeation degree) of nitrogen gas is substituted by the temperature in the fuel cell stack FS, and the pulsative pressure ΔP is set larger as the temperature in the fuel cell stack FS increases. According to this, hydrogen partial pressure in the power generation area can be ensured, even if a permeated amount of nitrogen gas from a cathode side increases.

As explained above, from the maps shown in FIGS. 6 and 7, the pulsative pressure ΔP can be set adequately according to the temperature in the fuel cell stack FS in view of concentration of nitrogen gas in the buffer tank 42 and a permeated amount of nitrogen gas from a cathode side.

More specifically, the pulsative pressure ΔP is set smaller than that in the normal pulsation control as shown in FIG. 9(a). The pulsative cycle ΔT is set longer than that in the normal pulsation control as shown in FIG. 10(a). After step S2, the activation control is executed based on the pulsative pressure ΔP and/or cycle ΔT that have/has been set (step S3).

During the activation control, it is judged whether or not the stack temperature detected by the stack temperature detector 50 is equal-to or higher-than the preset temperature Ts (step S4). When the stack temperature is equal-to or higher-than the preset temperature Ts (Yes in step S4), it can be assumed that the concentration of nitrogen gas in the fuel cell stack FS (the fuel cells FC) decreases sufficiently, so that transition to the normal pulsation control is made (step S5).

On the other hand, when the stack temperature is lower than the preset temperature Ts (No in step S4), it can be assumed that the permeated amount of nitrogen gas is small and the concentration of nitrogen gas in the buffer tank 42 doesn't yet decrease sufficiently, so that the activation control using the pulsative pressure ΔP and/or the pulsative cycle ΔT is continued (step S3). As explained above, a pulsation condition of anode gas is compensated to an appropriate condition for activation by changing over the activation control and the normal pulsation control.

In a case where the fuel cell system is activated with the pulsative pressure ΔP made small as shown in FIG. 9(a), the stack temperature increases because of power generation by the fuel cell stack FS as shown in FIG. 9(b) and the concentration of nitrogen gas in the buffer tank 42 decreases as shown in FIG. 9(c). The concentration decreasing of nitrogen gas occurs, because nitrogen gas in the fuel cell stack FS is exhausted to the buffer tank 42 and nitrogen gas in the buffer tank 42 is exhausted to the outside through the nitrogen purge valve 45.

In addition, the concentration of nitrogen gas in the fuel cell stack FS rapidly decreases along with increasing of anode gas supply pressure just after the activation is started as shown in FIG. 9(d), and then is slightly pulsated so that little amount of nitrogen gas flows reversely from the buffer tank 42 due to pressure pulsation of the small pulsative pressure ΔP during the activation control. However, an amount of the reverse flow is small because the pulsative pressure ΔP is small, so that the concentration of nitrogen gas in the fuel cell stack FS is kept low and doesn't affect the power generation. And then, after the transition to the normal pulsation control, the concentration of nitrogen gas in the fuel cell stack FS becomes almost zero due to sufficient exhaust by the large pulsative pressure ΔP. Note that, since the concentration of nitrogen gas in the buffer tank 42 is low after the transition to the normal pulsation control, nitrogen gas doesn't flow reversely from the buffer tank 42 even if the pulsative pressure ΔP is made large.

In a case where the fuel cell system is activated with the pulsative cycle ΔT made long as shown in FIG. 10(a), the stack temperature increases because of power generation by the fuel cell stack FS as shown in FIG. 10(b) and the concentration of nitrogen gas in the buffer tank 42 decreases as shown in FIG. 10(c) (the reason is explained above). In addition, the concentration of nitrogen gas in the fuel cell stack FS rapidly decreases along with increasing of anode gas supply pressure just after the activation is started as shown in FIG. 10(d), and then is pulsated with a long cycle so that little amount of nitrogen gas flows reversely from the buffer tank 42 due to pressure pulsation of the long pulsative cycle ΔT during the activation control. However, an amount of the reverse flow is small because the pulsative cycle ΔT is long, so that the concentration of nitrogen gas in the fuel cell stack FS is kept low and doesn't affect the power generation. And then, after the transition to the normal pulsation control, the concentration of nitrogen gas in the fuel cell stack FS becomes almost zero due to sufficient exhaust by the short pulsative cycle ΔT. Note that, since the concentration of nitrogen gas in the buffer tank 42 is low after the transition to the normal pulsation control, nitrogen gas doesn't flow reversely from the buffer tank 42 even if the pulsative cycle ΔT is made short.

In the operating method of the fuel cell system according to the present embodiment, the concentration of impurity gas (nitrogen gas) in the buffer tank 42 is detected, and then executed is the activation control with the pulsative pressure ΔP and/or the pulsative cycle ΔT of anode gas that are/is differentiated from that in the normal pulsation control. Therefore, at activation after long-time deactivation, an amount of the reverse flow of the impurity gas from the buffer tank 42 can be reduced, so that it becomes possible to get sufficient concentration of hydrogen gas in the fuel cell stack FS and to remove the impurity gas. In addition, according to the above-explained method for detecting concentration of impurity gas, the system can be controlled by using minimum sensors and so on, and can be simplified.

Note that, in an environment where a large amount of impurity gas stays in a fuel cell stack FS constituted of many fuel cells FC, difference may occur in residual amounts of water condensed on anode sides of the fuel cells. If impurity gas flows reversely due to pulsation of anode gas supply pressure in such a situation, insufficiency of hydrogen partial pressure on an anode-gas exhaust-side becomes conspicuous in a fuel cell(s) FC having a large residual amount of water.

In the operating method of the fuel cell system according to the present embodiment, even when difference occurs in residual amounts of water in the fuel cells, insufficiency of hydrogen partial pressure in fuel cells can be resolved because of little amount of impurity gas flowing reversely from the buffer tank 42, so that degradation and electrical voltage reduction of the fuel cells FC can be prevented.

In addition, a highly accurate control can be executed according to a condition of the fuel cell stack FS at activation by controlling the anode gas supply pressure based on the stack temperature. Further, a highly accurate control can be executed according to a condition of the fuel cell stack FS at activation also by controlling the anode gas supply pressure based on the deactivation time of the system Note that, in the present embodiment, the transition to the normal pulsation control is made (step S5) when the stack temperature becomes equal-to or higher-than the preset temperature during the activation control (Yes in step S4). However, the transition to the normal pulsation control from the activation control may be made when a preset time has elapsed from an activation start.

In addition, at least one of an activation control for making the pulsative pressure ΔP gradually larger and an activation control for making the pulsative cycle ΔT gradually shorter, as the stack temperature detected by the stack temperature detector 50 increases, can be executed. Note that, as a matter of course, it is possible to control both of the pulsative pressure ΔP and the pulsative cycle ΔT.

Specifically, the pulsative pressure ΔP during the activation control is gradually made larger along with increasing of the stack temperature as shown in FIG. 11(a). The stack temperature increases because of power generation by the fuel cell stack FS as shown in FIG. 11(h), and the concentration of nitrogen gas in the buffer tank 42 decreases as shown in FIG. 11(c) (the reason is explained above).

And, the concentration of nitrogen gas in the fuel cell stack FS rapidly decreases along with increasing of anode gas supply pressure just after the activation is started as shown in FIG. 10(d), and then is slightly pulsated shortly after the activation is started. However, an amount of the reverse flow is small because the pulsative pressure ΔP is small, so that the concentration of nitrogen gas in the fuel cell stack FS is kept low and doesn't affect the power generation. And then, the pulsative pressure ΔP is gradually made larger as the concentration of nitrogen gas in the buffer tank 42 decreases. However, even if an amount of a reverse flow of gas from the buffer tank 42 increases, an amount of the reverse flow of nitrogen gas doesn't increase because the concentration of nitrogen gas in the buffer tank 42 has become low. Therefore, an effect of dissolving accumulation of impurity gas in the fuel cell stack FS caused by the pulsation can be achieved earlier.

The pulsative cycle ΔT during the activation control is gradually made shorter along with increasing of the stack temperature as shown in FIG. 12(a). The stack temperature increases because of power generation by the fuel cell stack FS as shown in FIG. 12(b), and the concentration of nitrogen gas in the buffer tank 42 decreases as shown in FIG. 12(c) (the reason is explained above).

And, the concentration of nitrogen gas in the fuel cell stack FS rapidly decreases along with increasing of anode gas supply pressure just after the activation is started as shown in FIG. 12(d), and then is pulsated with a long cycle shortly after the activation is started. However, an amount of the reverse flow is small because the pulsative cycle ΔT is long, so that the concentration of nitrogen gas in the fuel cell stack FS is kept low and doesn't affect the power generation. And then, the pulsative cycle ΔT is gradually made shorter as the concentration of nitrogen gas in the buffer tank 42 decreases. However, even if an amount of a reverse flow of gas from the buffer tank 42 increases, an amount of the reverse flow of nitrogen gas doesn't increase because the concentration of nitrogen gas in the buffer tank 42 has become low. Therefore, an effect of dissolving accumulation of impurity gas in the fuel cell stack FS caused by the pulsation can be achieved earlier.

Note that the pulsative pressure control shown in FIG. 9 can be executed concurrently with the pulsative pressure control shown in FIG. 10 or 12. Similarly, the pulsative pressure control shown in FIG. 11 can be executed concurrently with the pulsative pressure control shown in FIG. 10 or 12.

In addition, in the above-explained fuel cell system, the normal pulsation control in which the pulsative pressure ΔP and/or the pulsative cycle ΔT of anode gas are/is kept constant can be executed, if water is generated in the anode flow passage of the fuel cell stack FS. The water generation can be extrapolated by using a generated water detection function (generated water detector).

In this case, the generated water increases along with power generating, and an amount of generated water per a fuel cell FC is known. Therefore, it is possible to extrapolate an amount of generated water in an entire of the anode flow passage including the fuel cell stack FS, the piping system and so on. The activation control unit 52 of the controller 51 functions as the generated water detector for detecting the water generation in the anode flow passage by extrapolation.

Specifically, the water generation in the anode flow passage is detected as shown in FIG. 13(d). The above-explained activation control (the controls shown in FIGS. 9 to 12 and a control with a combination of them) is executed, and then the transition to the normal pulsation control is made. And, in the normal pulsation control, if the water generation is detected, the pulsative pressure ΔP and/or the pulsative cycle ΔT are/is kept constant.

During that period, although the stack temperature increases because of power generation by the fuel cell stack FS as shown in FIG. 13(b) and the amount of generated water in the fuel cell stack FS increases along with power generating as shown in FIG. 13(c), the generated water is discharged from the fuel cell stack FS by the normal pulsation operation.

According to the above embodiments, at activation after long-time deactivation, a reverse flow of impurity gas from the buffer tank 42 is prevented, so that it becomes possible to get sufficient concentration of hydrogen gas in the fuel cell stack FS and to remove the impurity gas.

The operating method of the fuel cell system is not limited to the above embodiments. For example, a nitrogen gas detector 54 for detecting concentration of nitrogen gas in the buffer tank 42 may be provided as shown by dotted lines in FIG. 1 instead of an impurity gas concentration extrapolation function of the activation control unit 52. As the nitrogen gas detector 54, a nitrogen gas sensor may be used. In this case, the concentration of nitrogen gas detected by the nitrogen gas detector 54 is used in the control instead of the concentration of impurity gas extrapolated by the activation control unit 52.

A nitrogen gas detector 55 for detecting concentration of nitrogen gas on an anode side in the fuel cell stack FS may be provided as shown by dotted lines in FIG. 1. As the nitrogen gas detector 55, a nitrogen gas sensor may be used. In this case, not the extrapolated concentration of nitrogen gas, but the concentration of nitrogen gas detected by the nitrogen gas detector 55 is used in the control.

Since the concentration of nitrogen gas in the buffer tank is actually detected by the nitrogen gas detector 54 or the nitrogen gas detector 55, a highly accurate control can be executed according to a condition of the fuel cell system at activation.

Note that concentration of anode gas is "hydrogen concentration≈100−nitrogen concentration−water vapor concentration". The water vapor concentration can be extrapolated, to some extent, from an operation state of the fuel cell. Namely, the hydrogen concentration can be known if the nitrogen concentration is obvious, so that it is possible to extrapolate concentration of nitrogen gas by use of a hydrogen concentration sensor. Therefore, a hydrogen gas detector may be used instead of the nitrogen gas detector 54 or the nitrogen gas detector 55.

The entire contents of Japanese Patent Applications 2010-202267 (filed Sep. 9, 2010) are incorporated to this Specification by reference. Although the invention has been described above by reference to certain embodiments of the invention, the invention is not limited to the embodiments described above. Scope of the invention should be defined in view of claims.

The invention claimed is:

1. An anode gas non-recirculation type fuel cell system, comprising:
　a fuel cell stack comprised by stacking a plurality of fuel cells;
　a buffer tank configured to discharge, to an outside, impurity gas included in anode off-gas exhausted from the fuel cell stack;

an impurity gas concentration detector configured to detect a concentration of impurity gas in the buffer tank; and an anode gas supply unit configured to supply anode gas to the fuel cell stack, wherein, when pressure-supplying impurity gas in the fuel cell stack to the buffer tank while pulsating a supply pressure by the anode gas supply unit, an activation control is executed by changing, by the anode gas supply unit, at least one of a pulsative pressure and a pulsative cycle of anode gas supply according to the concentration of impurity gas in the buffer tank detected by the impurity gas concentration detector, and the anode gas supply unit sets the pulsative pressure smaller or sets the pulsative cycle longer, during the activation control, when the concentration of impurity gas is high than when the concentration of impurity gas is low.

2. An operating method of an anode gas non-recirculation type fuel cell system that includes a fuel cell stack comprised by stacking a plurality of fuel cells, a buffer tank for discharging, to an outside, impurity gas included in anode off-gas exhausted from the fuel cell stack, and an impurity gas concentration detector for detecting a concentration of impurity gas in the buffer tank, the fuel cell system configured to pressure-supply impurity gas in the fuel cell stack to the buffer tank by pulsating a supply pressure of anode gas to the fuel cell stack, the method comprising:

executing an activation control for changing at least one of a pulsative pressure and a pulsative cycle of anode gas being supplied to the fuel cell stack according to the concentration of impurity gas in the buffer tank detected by the impurity gas concentration detector, and setting the pulsative pressure smaller or setting the pulsative cycle longer, during the activation control, when the concentration of impurity gas is high than when the concentration of impurity gas is low.

3. The operating method of a fuel cell system according to claim 2, wherein the impurity gas concentration detector is a stack temperature detector for detecting temperature in the fuel cell stack, and the pulsative pressure is set small when temperature in the fuel cell stack detected by the stack temperature detector is lower than a preset temperature.

4. The operating method of a fuel cell system according to claim 3, wherein the pulsative pressure is made gradually larger during the activation control.

5. The operating method of a fuel cell system according to claim 2, wherein the impurity gas concentration detector is a stack temperature detector for detecting temperature in the fuel cell stack, and the pulsative cycle is set longer when temperature in the fuel cell stack detected by the stack temperature detector is lower than a preset temperature.

6. The operating method of a fuel cell system according to claim 5, wherein the pulsative cycle is made gradually shorter during the activation control.

7. The operating method of a fuel cell system according to claim 2, wherein the fuel cell system further includes a timer for measuring a deactivation time of the fuel cell system, and the activation control is executed if the deactivation time detected by the timer is equal-to or longer-than a preset time.

8. The operating method of a fuel cell system according to claim 2, wherein the fuel cell system further includes a generated water detector for detecting an existence or a nonexistence of generated water in an anode flow passage, and a normal pulsation control in which at least one of the pulsative pressure and the pulsative cycle is kept constant is executed when generated water is detected by the generated water detector.

9. The anode gas non-recirculation type fuel cell system according to claim 1, further comprising a controller programmed to execute the activation control.

10. The operating method of a fuel cell system according to claim 2, wherein the fuel cell system further comprises a controller programmed to execute the activation control.

\* \* \* \* \*